July 4, 1933.   D. J. STEWART   1,916,909
ALTERNATING CURRENT MOTOR
Filed Feb. 9, 1931
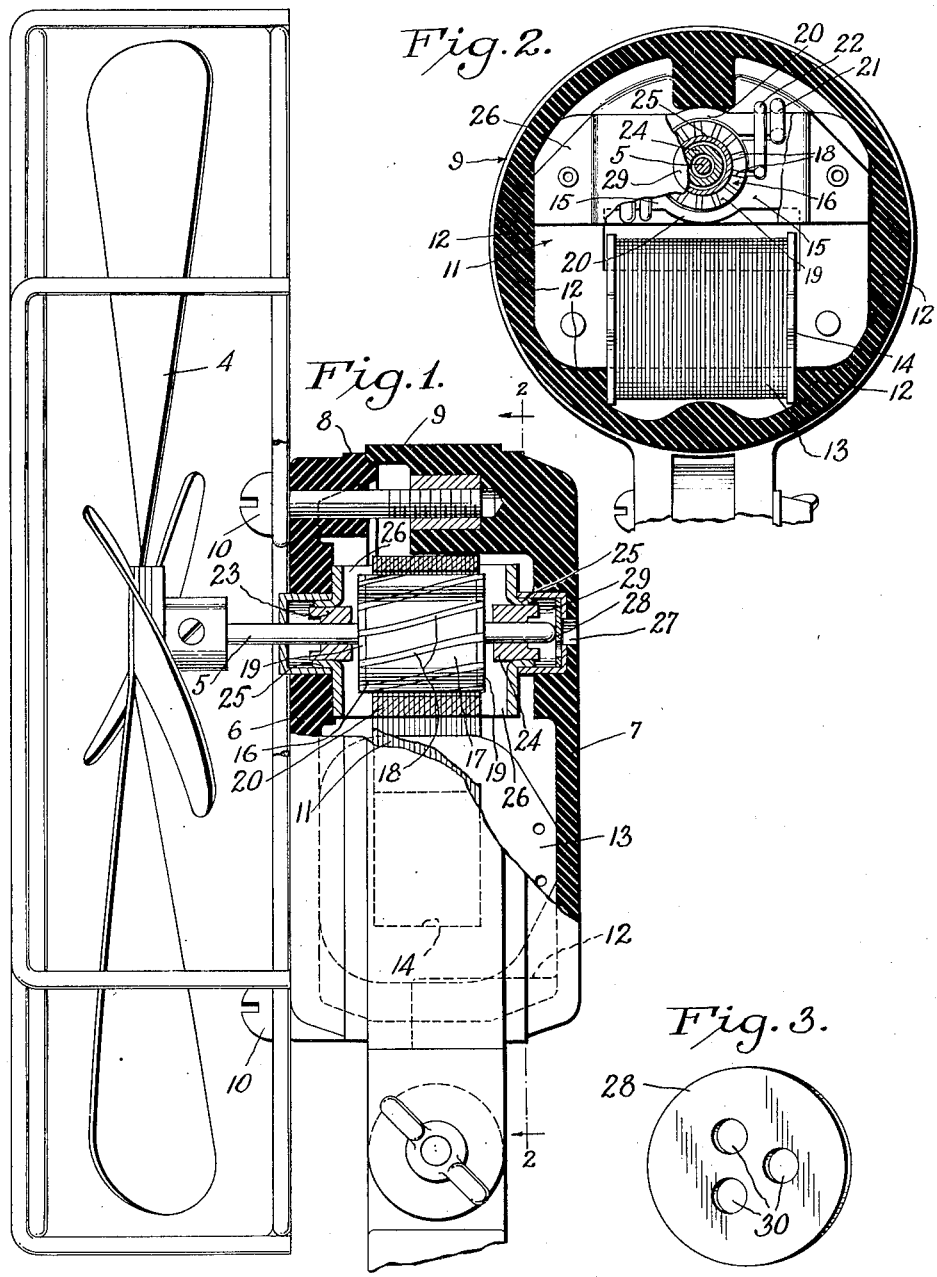
INVENTOR
Duncan J. Stewart.
BY
Churchill, Parker + Carlson
ATTORNEYS Patented July 4, 1933

1,916,909

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

ALTERNATING CURRENT MOTOR

Application filed February 9, 1931. Serial No. 514,345.

This invention relates to alternating current motors and has more particular reference to the arrangement of a thrust bearing for the shaft of such a motor.

The rotor of an alternating current motor tends to maintain itself in magnetically centered position. If the motor is so positioned or under a load such that an endwise thrust is exerted on the rotor capable of moving the same out of magnetically centered position, the rotor will become centered periodically with the current pulsations. The resulting longitudinal vibration causes objectionable noise and wear on the parts.

The primary object of the present invention is to overcome the above difficulty by the provision of a thrust bearing acting to hold the rotor of the motor off from magnetically centered position in a direction opposite to that in which the end thrust on the rotor acts.

The invention also resides in the novel construction and mounting of the thrust bearing.

Other objects and advantages of the invention will become apparent from the following detailed description taken in conjunction with the accompanying drawing, in which:

Figure 1 is an enlarged side elevational view of a portable electric fan having an electric motor embodying the features of the present invention, portions of the motor casing and stator being cut away to show the rotor and its bearing in section.

Fig. 2 is a sectional view taken substantially along line 2—2 of Fig. 1.

Fig. 3 is a perspective view of a part of the thrust bearing.

The electric fan shown by way of illustration in the drawing embodies a blade 4 fast on the forward end of a shaft 5 which projects into a casing composed of non-metallic insulating material. The casing comprises front and back wall plates 6 and 7 having peripheral flanges 8 and 9 which are clamped together in interfitting relation by screws 10.

The shading ring induction motor employed for rotating the fan blade has a stator comprising a stack of rectangular laminations forming an open framework 11 which is snugly received in the back portion of the casing between lugs 12 integral with and projecting inwardly from the flange 9. A coil 13 is wound on the leg 14 of the stator and is disposed in the lower portion of the casing.

The opposite leg of the stator defines two alined poles 15 having opposing concave faces which define a recess in which is disposed a cylindrical rotor 16 of the squirrel-cage type and of relatively small diameter, that is, approximately equal to the width of the poles 15. Herein the rotor is composed of a solid laminated iron core 17 having an axial length substantially equal to the thickness of the stack of stator laminations. Inductor bars 18 embedded in the core are electrically connected at their opposite ends by copper disks 19. It will be apparent that in a rotor thus constructed the magnetic center coincides substantially with its space center so that the rotor will be magnetically centered in the stator when the longitudinal center of the core coincides with the longitudinal center of the rotor recess defined by the stator.

A substantially closed magnetic connection closely following the rotor contour is formed between the opposing side tips of the poles. Herein this connection is formed by bridges 20 of relatively narrow radial width with their opposite ends preferably made integral with the pole tips.

The rotating megnetic field for causing motor torque when the winding 13 is energized by alternating current is produced by two shading rings 21 and 22 on each pole. The smaller ring 21 encloses approximately one-third of the pole section while the larger ring encloses this same area and also an additional one-third of the pole section leaving the remainder of the pole area unshaded.

The squirrel cage rotor 16 is fast on the shaft 5 which is journaled closely adjacent the rotor in bearing blocks 23 and 24 pressed into flanges 25 at the center of brackets 26. The latter are in the form of flat plates of non-magnetic metal lying along opposite sides of the stator poles with their opposite ends bent to lie flat against the stator to which they are secured by rivets. The rotor is thus ruggedly mounted independently of the casing thereby enabling the motor to be separately assembled as a unit.

With the motor mounted in the casing as above described, the cap for the forward bearing 23 projects through a hole in the wall 6 while the rear bearing 24 projects into an inwardly opening recess formed in the rear wall plate 7 in communication with an oil hole 27.

For the purpose above set forth, a thrust bearing is provided for holding the rotor 16 in fixed axial position so that the end thrust on the shaft resulting from rotation of the fan is never completely overcome by the tendency of the rotor to center itself in the stator. To this end, it is preferred to locate the thrust bearing so that it will hold the rotor slightly off from its magnetic center in a direction opposite to that in which the fan thrust acts. As shown particularly in Fig. 1, the thrust bearing herein employed is arranged to act on the end of the shaft opposite the fan blade 4 and comprises a circular disk 28 seated in the end of a cap 29 which fits over and is pressed onto the flange 25 of the rear bearing plate 26. Thus the thrust bearing constitutes a part of the motor unit which enables the rotor to be located accurately relative to the stator prior to assembly of the motor in the casing.

The end of the shaft 5 which bears against the center of the disk 28 is preferably rounded (see Fig. 1) so as to minimize the frictional torque resisting rotation of the shaft. Preferably the disk 28 is formed with a plurality of holes 30 (Fig. 3) annularly spaced around the point of contact between the disk and the shaft so that oil supplied to the hole 27 may flow into and accumulate in the pocket which the cap 29 defines around the end of the shaft. Thus the thrust bearing and also the bearing 24 may be lubricated conveniently.

With the rotor thus shifted forwardly out of magnetically centered position with respect to the stator, it will be apparent that the force resulting from the solenoid action of the stator tending to center the rotor will be directed rearwardly, thereby tending to hold the shaft 5 in contact with the bearing disk 28. The end thrust exerted by the fan plate acts in this same direction with the result that the periodic changes in the solenoid action due to alterations in the current energizing the stator does not result in the application of a resultant force tending to move the rotating parts forwardly. That is to say, the shaft is always maintained in contact with its thrust bearing and the periodic variations in the tendency of the rotor to center itself merely vary the pressure on the thrust bearing. In this way, axial vibration of the rotating parts and the noise incident thereto is effectually eliminated.

It will be observed that the result just described could also be attained by locating the thrust bearing so that the rotor of the motor would be magnetically centered with respect to the stator, but this would involve a more accurate positioning of the rotating parts. It is preferred, therefore, to shift the rotor off center in the forward direction just far enough to allow some latitude in positioning of the thrust bearing thereby insuring that variances in ordinary manufacture will not allow the rotor to become shifted to the opposite side of its magnetically centered position. Therefore it is contemplated that the degree of this offset need be sufficient only to insure at all times the maintenance of continuous pressure of the shaft 5 on its thrust bearing.

I claim as my invention:

1. The combination of an electric motor having a stator arranged to be energized by alternating current and a shaft normally urged endwise in a direction to shift the rotor out of magnetically centered position with respect to said stator, and a thrust bearing acting to hold the rotor out of magnetically centered position in the opposite direction.

2. The combination of an electric motor having a stator arranged to be excited by alternating current and providing a plurality of poles defining a rotor recess, a rotor in said recess, bearing brackets rigid with said stator and located at opposite ends of said recess, a shaft for said rotor under a constant load which exerts an endwise thrust on the rotor, said shaft being journaled in said brackets and having one end terminating adjacent one of the brackets, a thrust member supported by the last mentioned bracket positioned, when in engagement with the end of said shaft, to hold said rotor offset from magnetically centered position in a direction opposite to that in which said end thrust acts.

3. The combination of an electric motor having a stator arranged to be excited by alternating current and providing a plurality of poles defining a rotor recess, a rotor in said recess, bearing brackets rigid with said stator and located at opposite ends of said recess, a shaft for said rotor journaled in said brackets and having one end terminating adjacent one of the brackets, a cap supported by said last mentioned bracket and enclosing the end of said shaft, said cap having an end opening therein, a disk within said cap having a central portion abutting against said end and annularly spaced apertures communicating with said opening to permit the entry of lubricant to said thrust member through said cap, said disk holding said shaft out of magnetically centered position with respect to said stator.

4. An alternating current electric motor having a squirrel cage rotor with a cylindrical iron core, a stator providing poles of a thickness approximating the length of said core, and a thrust bearing acting on the shaft of said rotor to maintain said core offset axially in one direction with respect to said poles.

5. The combination with an alternating current motor having a rotor and a stator, of means driven by the motor and acting constantly during operation thereof to exert on the rotor an end thrust capable of shifting the rotor, when unrestrained, out of magnetically centered position with respect to the stator, said stator when energized by alternating current exerting during a part only of the current cycle a force of greater magnitude than said thrust tending to hold the rotor in magnetically centered position, and a thrust bearing acting constantly to hold said rotor out of centered position relative to said stator, whereby to prevent vibration of the rotor.

In testimony whereof, I have hereunto affixed my signature.

DUNCAN J. STEWART.